United States Patent [19]
Nakajima et al.

[11] Patent Number: 5,295,039
[45] Date of Patent: Mar. 15, 1994

[54] METHOD OF APPLYING SINGLE POLAR ELECTRO-STATIC CHARGES TO CONTINUOUSLY TRAVELLING LONG WEB SUPPORT, AND APPARATUS PRACTICING SAME

[75] Inventors: Kenji Nakajima; Atsuo Futami, both of Kanagawa, Japan

[73] Assignee: Fuji Photo Film Co., Ltd., Kanagawa, Japan

[21] Appl. No.: 970,962

[22] Filed: Nov. 3, 1992

Related U.S. Application Data

[63] Continuation of Ser. No. 491,999, Mar. 12, 1990, abandoned.

[30] Foreign Application Priority Data

Mar. 10, 1989 [JP] Japan .................. 1-56378

[51] Int. Cl.$^5$ .................. H05F 3/02; H01T 19/00
[52] U.S. Cl. .................. 361/225; 118/638; 250/325; 361/221
[58] Field of Search .................. 361/225, 226, 229, 361/212-214, 221; 118/638, 621; 250/325, 326; 427/27, 32, 128, 458, 460, 471; 428/694; 355/219, 221; 430/532, 937; 29/631.1, DIG. 95

[56] References Cited

U.S. PATENT DOCUMENTS

| | | | |
|---|---|---|---|
| 3,391,044 | 7/1968 | Kaghan et al. | 361/233 |
| 3,729,648 | 4/1973 | Kerr | 361/213 |
| 3,739,246 | 6/1973 | Haas | 361/225 |
| 3,888,678 | 6/1975 | Bailey, Jr. et al. | 96/87 A |
| 3,888,753 | 6/1975 | Kiikka et al. | 250/325 |
| 3,906,501 | 9/1975 | Kiess | 346/153.1 |
| 4,234,300 | 11/1980 | Yamagisi et al. | 425/363 |
| 4,281,247 | 7/1981 | Schuster | 250/324 |
| 4,379,630 | 4/1983 | Suzuki | 355/274 |
| 4,457,256 | 7/1984 | Kisler et al. | 118/621 |
| 4,649,097 | 3/1987 | Tsukada et al. | 250/326 |
| 4,739,363 | 4/1988 | Hoshika et al. | 361/214 |
| 4,764,842 | 8/1988 | Cranskens et al. | 361/230 |
| 4,791,032 | 12/1988 | Komatsu et al. | 428/694 |
| 4,991,388 | 2/1991 | Kato | 57/328 |
| 5,169,450 | 12/1992 | Opad et al. | 427/535 |

FOREIGN PATENT DOCUMENTS 8905477 6/1989 PCT Int'l Appl. .
2092266 11/1981 United Kingdom .

OTHER PUBLICATIONS

European Search Report World Patent Index Latest.

Primary Examiner—Jeffrey A. Gaffin
Assistant Examiner—Richard T. Elms
Attorney, Agent, or Firm—Sughrue, Mion, Zinn, Macpeak & Seas

[57] ABSTRACT

A charging apparatus for applying single polar electrostatic charges to a surface of a continuously travelling long web support before coating the support with a coating composition comprises a fine wire shaped corona discharging electrode connected to a electric source and a pass roller coated by a coating, the pass roller facing said corona discharging through the support.

16 Claims, 2 Drawing Sheets

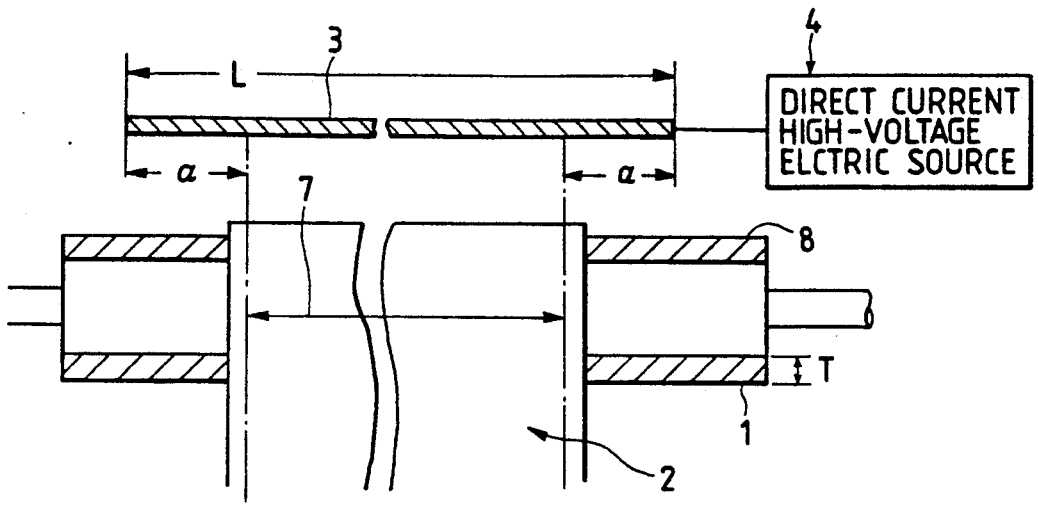
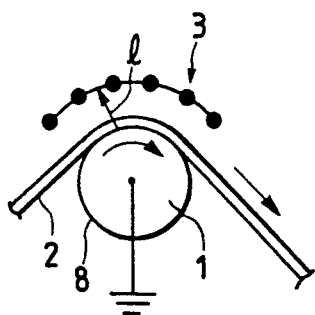
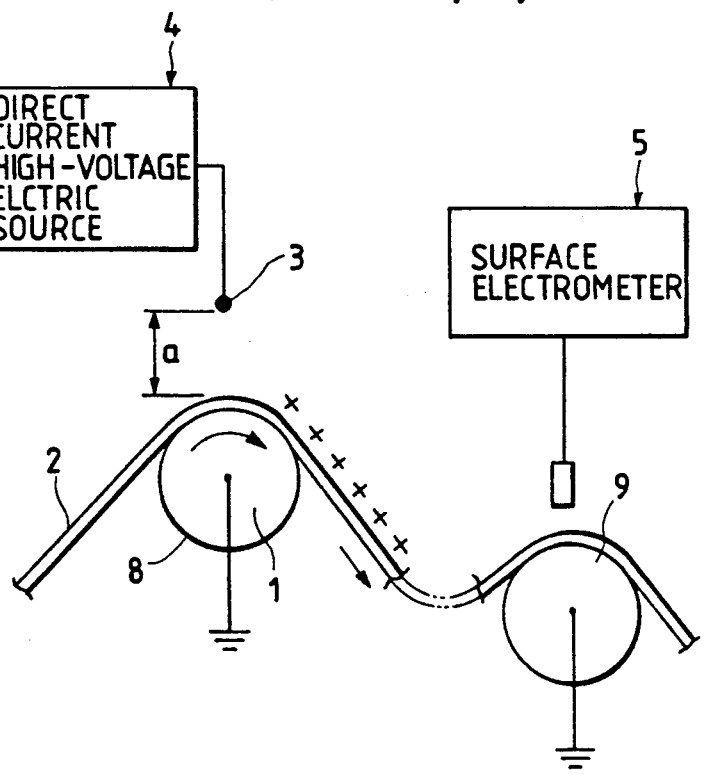

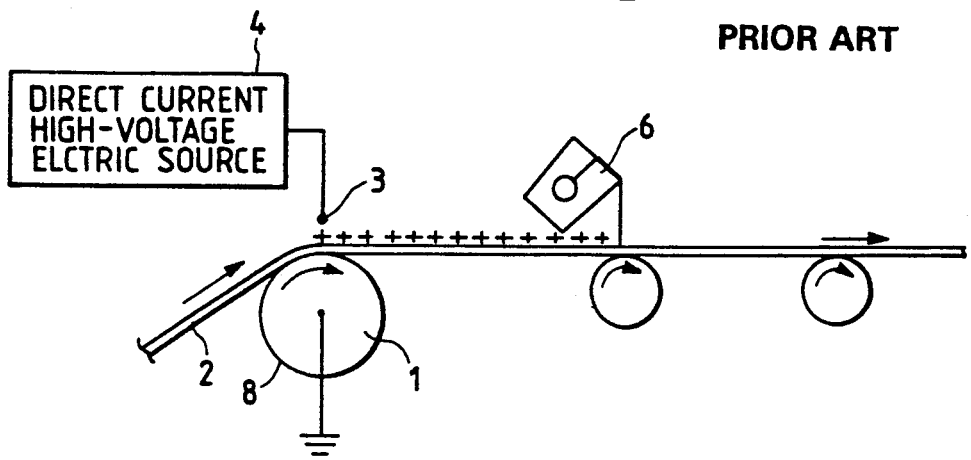
FIG. 3 PRIOR ART
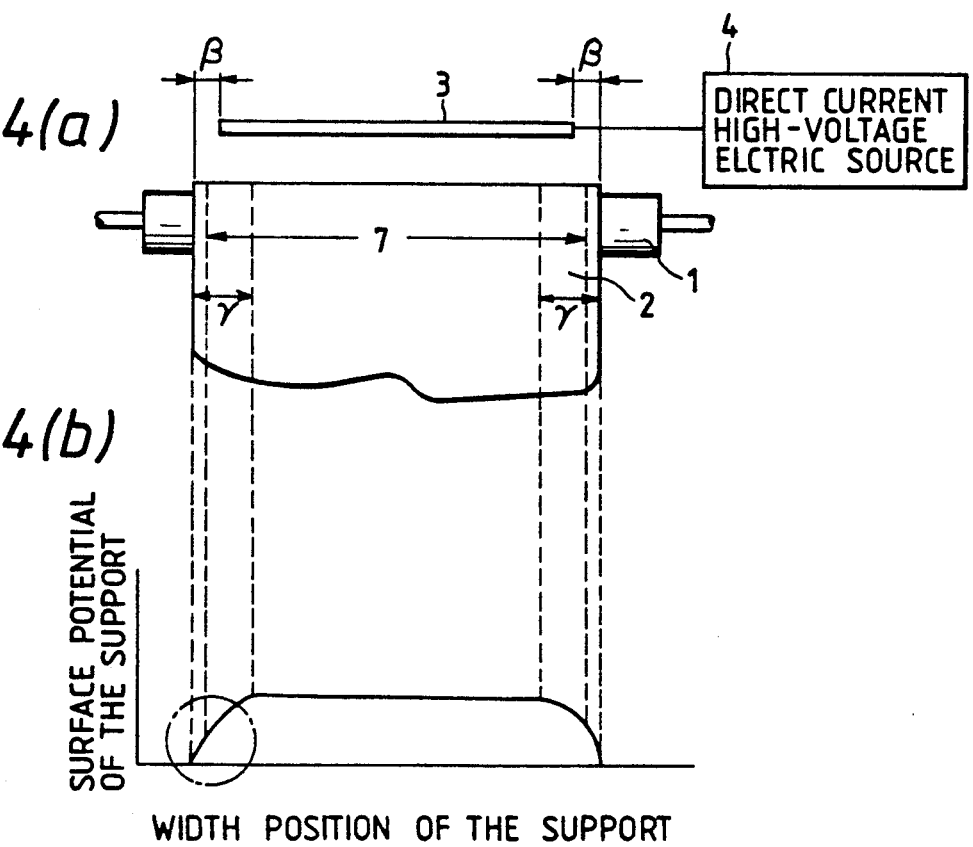
FIG. 4(a)
FIG. 4(b)
WIDTH POSITION OF THE SUPPORT

METHOD OF APPLYING SINGLE POLAR ELECTRO-STATIC CHARGES TO CONTINUOUSLY TRAVELLING LONG WEB SUPPORT, AND APPARATUS PRACTICING SAME

This is a continuation of application Ser. No. 07/491,999 filed Mar. 12, 1990, now abandoned.

FIELD OF THE INVENTION

This invention generally relates to a coating method and, particularly, to a process of coating a continuously travelling long web support with a coating composition such as photographic emulsion(s), a magnetic coating composition, etc., in the production of photographic light-sensitive materials such as photographic light-sensitive films, photographic light-sensitive papers, etc.; photographic printing plate-making materials; magnetic recording media such as magnetic audio tapes, magnetic video tapes, etc.; pressure-sensitive copying papers; heat-sensitive copying papers, etc.

More particularly, the invention relates to an electrostatically charging method for applying an electric potential to the support at the portion to be coated with the aforesaid coating composition directly before coating said support with the coating composition, to assist in applying the coating composition to the portion of the support.

BACKGROUND OF THE INVENTION

In a conventional method of coating, as shown in FIG. 3 and FIG. 4a and 4b of the accompanying drawings, a single polar electrostatic charges applied on the surface of a support 2 by corona discharging from a corona discharging electrode 3 generated by a direct current high-voltage electric source 4, thereafter a liquid coating composition corresponding to a photographic light-sensitive material on a support 2 by means of a coating device is disclosed in U.S. Pat. No. 4,457,256 and a method of applying electrostatic discharging generated by a high-frequency high voltage on the surface of a support 2 to oxidize the surface of the support, wherein the surface of a grounded metal pass roller is insulated by a titanic acid series ceramic, etc., is disclosed in U.S. Pat. No. 4,649,097 and Japanese Patent Unexamined Publication No. Sho. 63-238139.

However, the method described in aforesaid U.S. Pat. No. 4,457,256 has the following problem. That is, since the surface of a grounded pass roller 1 is electrically conductive, it is required to reduce the length of the corona discharging electrodes 3 by $\beta \simeq 5$ mm shorter than the width of the support 2 at each end thereof for preventing the occurrence of spark discharging between the corona discharging electrode 3 and the surface of the grounded pass roller 1 as shown in FIG. 4(a), thereby the surface potential of the support 2 is reduced at the vicinity $\gamma$ of each end as shown in FIG. 4(b), and hence the coating composition is liable to be cut at high speed coating to reduce the yield thereof.

Also, the methods described in U.S. Pat. No. 4,649,097 and Japanese Patent Unexamined Publication No. Sho. 63-238139 propose that a grounded pass roller is insulated by a ceramic for avoiding the occurrence of sparking as described above but since a high-frequency high voltage is employed as the discharging voltage, it is necessary to apply coating of the insulating material having a thickness of at least 0.5 mm onto the grounded pass roller for desirably preventing the occurrence of sparking. However, in the case of applying corona discharging to the support by a direct current high voltage, the discharging current is greatly reduced if such an insulating layer of grounded pass roller has such a thickness. Therefore, the conventional method can not be practically used for applying a desired surface potential to a support by corona discharging by d.c. high voltage.

SUMMARY OF THE INVENTION

The object of this invention is, therefore, to solve the problems described above in the conventional techniques and to provide an electrostatically charging method for a support capable of excluding the danger of causing spark discharging, solving the problem of the reduction of the surface potential at the end portions of a support to be coated with a coating composition, and insuring a necessary surface potential of the support for coating stably and at high speed with a high yield.

It has now been discovered that the aforesaid object of this invention can be attained by lengthening the length of a corona discharging electrode longer than the width of a support being coated to keep the surface potential of the end portions of the support, thereby preventing the occurrence of cutting of coating liquid at high-speed coating, and applying corona discharging by d.c. high voltage onto the travelling support supported by a grounded pass roller the surface of which is coated with aluminum oxide particles, thereby the surface of the support is charged at a necessary potential without danger of causing spark discharging.

That is, according to this invention, there is provided a charging method for applying single polar electrostatic charges on the surface of a continuously travelling long web support by corona discharging directly before coating the support with a coating composition, which comprises lengthening the length of the corona discharging electrode at least 10 mm over each end of the support at the coating portion and applying corona discharging generated by a current high-voltage electric source and a grounded pass roller faces the aforesaid corona discharging electrode through the support, said pass roller being coated with a ceramic having a thickness of range which is not less than 0.3 mm but less than 0.5 mm ($0.3 \text{ mm} \leq T < 0.5 \text{ mm}$).

BRIEF DESCRIPTION OF THE DRAWINGS

FIG. 1 is a schematic front view showing a charging portion in an embodiment of the support charging method of this invention;

FIG. 2(a) is a side view showing a test apparatus in an example of this invention;

FIG. 2(b) is a partial side view showing the disposition relation of a corona discharging electrode and a grounded pass roller in the case of FIG. 2(a);

FIG. 3 is a side view showing an example of the support charging method of this invention and a coating apparatus using the method;

FIG. 4(a) is a schematic front view showing the relation of a corona discharging electrode and a support for explaining a conventional support charging method; and FIG. 4(b) is a view showing the surface potential distribution of the surface of the support in the width direction.

DETAILED DESCRIPTION OF THE INVENTION

The charging method of this invention can effectively coat with various coating composition such as for photographic light-sensitive materials, photographic printing plate making materials, magnetic recording media, etc., on continuously travelling supports such as plastic films at high speed.

Then, the support charging method of this invention is explained on an embodiment shown by the accompanying drawings.

FIG. 3 is a schematic side view showing an embodiment of the support charging method of this invention and a coating apparatus utilizing the charging method.

The support charging method of this invention is as follows. In a method of applying single polar charge generated by a direct current high-voltage electric source 4 (e.g., + charges) on the surface of a continuously travelling long web support 2 by a corona discharging electrode 3 directly before coating the support with a coating composition by a coating device 6 as shown in FIG. 3, the length of the corona discharging electrode 3 through the support is lengthened at least $a = 10$ mm over each end of the coating portion 7 of the support 2 as shown in FIG. 1 and a grounded pass roller 1 facing the aforesaid corona discharging electrode 3 is coated by a ceramic coating 8 having a thickness in the range which is not less than 0.3 mm but less than 0.5 mm.

In the case of coating a continuously travelling long web support with a coating composition, the width of the coating portion of the support is generally shorter than the width of the support itself by about 2 to 3 mm in each end and roulette mark portions 10 of the end portions of the support are frequently not coated. Roulette mark portions mean that the concave and convex pattern are only formed on the end portion of the film by mechanical embossing generally through heating to prevent the displacement of the film, when the film is wound in roll form, and wavy pleats. Accordingly, both ends of the coating portion of the support are deviated a little to the center direction.

As the material of the grounded pass roller for use in this invention, aluminum, stainless steel, etc., can be used.

For forming a ceramic coating on the surface of the grounded pass roller, aluminum oxide ($Al_2O_3$) particles (particle sizes from 30 to 40 $\mu$m) are applied thereto by a plasma projection to form an insulating coated layer.

As the material for the corona discharging electrode in this invention, a metal, carbon fibers, etc., can be used and the electrode may be used as the form of a fine wire, brush, knife edge, tabular electrode, etc.

The support for use in this invention includes a paper, a plastic film, a resin-coated paper, a synthetic paper, etc. As the materials for plastic films, there are polyolefins such as polyethylene, polypropylene, etc.; vinyl polymers such as polyvinyl acetate, polyvinylchloride, polystyrene, etc.; polyamides such as 6,6-nylon, 6-nylon, etc.; polyesters such as polyethylene terephthalate, polyethylene-2,6-naphthalate, etc.; polycarbonate; and cellulose acetates such as cellulose triacetate, cellulose diacetate, etc.

Also, as the resin for a resin-coated paper, there are polyethylene, polyolefins, etc., and a paper may be coated at one surface or both surfaces.

Also, a "coating composition" in this invention includes various kinds of liquid compositions. For example, there are coating compositions for silver halide emulsion layers, subbing layers, protective layers, back layers, etc., of photographic light-sensitive materials; coating compositions for magnetic layers, subbing layers, lubricating layers, protective layers, back layers, etc., of magnetic recording media; and coating compositions for adhesive layers, coloring layers rust preventing layers, etc. The coating composition contains a water-soluble binder or an organic solvent-soluble binder.

For applying the coating composition onto the support, slide coating, roller coating, bead coating, spray coating, extrusion coating, curtain coating, etc., can be employed although other methods can be also used.

The following examples will still further illustrate the present invention.

EXAMPLE 1

The charging test was carried out under the following conditions as shown in FIG. 2(a).

As the grounded pass roller 1, an aluminum roller having an insulating layer thereon formed by plasma projecting aluminum oxide particles (particle size from 30 to 40 $\mu$m) onto the surface thereof was used. In this example, such aluminum rollers each having an insulating layer thickness of 0 (no layer), 0.2 mm, 0.3 mm, 0.4 mm, 0.5 mm, 0.7 mm or 1.0 mm were prepared.

As the support 2, a paper having a base weight of 115 g/m$^2$, both the surfaces of which were coated with polyethylene at a thickness of 30 $\mu$m each and a coated width of 300 mm, was used and continuously travelled at a speed of 200 m/min.

As corona discharging electrodes 3, six tungsten fine wires each having a diameter of 135 $\mu$m were disposed concentrically with the grounded pass roller 1 as shown in FIG. 2(b). In this case, the distance between the support 2 and each corona discharging electrode 3 was 5 mm and the length of each corona discharging electrode was 280 mm, the center of which was just over the center of the support.

As a direct current electric source 4, Model 664 (trade name, manufactured by TREK Co.) was used and two kinds of voltages, 6.5 kv and 7.5 kv were employed as the voltage being applied to the electrodes.

The support was charged under the aforesaid conditions and the surface potential of the support 2 at the central portion was measured at a grounded measuring roller 9 to which surface charges were not added by means of a surface electrometer 5 (Model 334, manufactured by TREK Co.).

Apart from this, when the support 2 did not exist between the corona discharging electrodes 3 and the grounded pass roller 1, a d.c. voltage of 10 kv was applied to the electrode 3 and the occurrence of spark discharging between the electrode 3 and the grounded pass roller 1 was confirmed.

The results obtained are shown in Table 1 below.

TABLE 1

| Thickness (mm) of ceramic coating | Surface Potential (v) of Support Applied Voltage (kv) | | Sparking at Application of 10 kv |
|---|---|---|---|
| | 6.5 kv | 7.5 kv | |
| 0 | 1050 v | 2100 v | occurred |
| 0.2 | 1000 v | 2000 v | " |
| 0.3 | 980 v | 1970 v | none |
| 0.4 | 960 v | 1950 v | " |

TABLE 1-continued

| Thickness (mm) of ceramic coating | Surface Potential (v) of Support Applied Voltage (kv) | | Sparking at Application of 10 kv |
|---|---|---|---|
| | 6.5 kv | 7.5 kv | |
| 0.5 | 930 v | 1920 v | " |
| 0.7 | 700 v | 1500 v | " |
| 1.0 | 600 v | 1400 v | " |

From the results shown in Table 1, it can be seen that the thickness of the ceramic insulating coating layer capable of causing less reduction of the surface potential of the support without causing spark discharging is from 0.3 mm to 0.5 mm.

EXAMPLE 2

As the grounded pass roller 1, an aluminum roller the surface of which was coated with an aluminum oxide layer having a thickness of 0.4 mm was used.

As the support 2, the polyethylene-coated paper having a width of 300 mm as in Example 1 was used.

As a d.c. electric source 4, the electric source as used in Example 1 was used.

As the corona discharging electrode 3, the same electrode as in Example 1 except the length thereof was employed. That is, six sets of electrodes each having a length of 310 mm, 320 mm, 330 mm, 340 mm, 350 mm or 360 mm were prepared.

The applied voltage to the electrodes was 6.5 kv, 7.5 kv or 8.5 kv.

The distance (d) between the electrode and the support was 2.5 mm, 5 mm or 7.5 mm.

The surface potential of the support was measured in each case by the same manner as in Example 1 except that in this case, the surface potential was measured at two points, i.e., the center and the edge portion of the support. Thus, the length (L) of the electrode by which the surface potential of the edge portion of the support became at least 90% of the surface potential at the center of the support was determined.

The necessary length (L) of the electrode for the distance between the electrode and the support and the applied voltage are shown in Table 2 below.

TABLE 2

| Distance d (mm) between Electrode and Support | Applied Voltage (kv) | Necessary Electrode Length L (mm) |
|---|---|---|
| 2.5 | 6.5 | 330 |
| " | 7.5 | 320 |
| " | 8.5 | 310 |
| 5.0 | 6.5 | 350 |
| " | 7.5 | 340 |
| " | 8.5 | 330 |
| 7.5 | 6.5 | 360 |
| " | 7.5 | 350 |
| " | 8.5 | 340 |

From the results shown in Table 2 above, it can be seen that the length of the electrode necessary for obtaining a uniform surface potential of the support in the width direction of the support becomes shorter as the distance d between the electrode and the support is smaller and the voltage applied to the electrode is higher and in the applied voltage of from 6.5 to 7.5 kv, which is an ordinary voltage in the technique, it is necessary that the necessary length L of the electrode is at least 320 mm, i.e., is longer than the width 300 mm of the support at least 10 mm over each end of the support.

As described above, in the support charging method of this invention, since the surface potential at the end portions of a coating portion of a support can be kept at almost the same surface potential as at the central portion of the support by lengthening the necessary length of a corona discharging electrode for charging the support at least 10 mm over each end of the coating portion of the support in the width direction, a coating composition can be coated with an increased coating yield without causing cutting of the coating liquid at high-speed coating, and also by coating the surface of a grounded pass roller with a ceramic coating layer of a relatively thin thickness of from 0.3 mm to 0.5 mm, a uniform surface potential is obtained on all the surface of the coating portion of the support stably without causing spark discharging at a relatively low applied voltage.

Thus, according to the method of this invention, a coating composition can be stably coated on a continuously travelling support at high speed.

What is claimed is:

1. A charging method for applying single polar electrostatic charges onto a first surface of a continuously travelling long web support before coating said support with a coating composition said support having a coating portion and a roulette mark portion on each side of said coating portion, said method comprising the steps of:

placing a corona discharging electrode adjacent to said first surface of said support, said corona discharging electrode being connected to a direct-current high-voltage electric source and applying single polar electrostatic charge onto said first surface of said support, said corona discharging electrode being wider than said support by a predetermined distance;

placing a pass roller having a surface that is coated with ceramic adjacent to a second surface of said support such that said pass roller faces said electrode with said support disposed therebetween, said ceramic surface coating having a thickness in the range of greater than or equal to 0.3 mm and less than 0.5 mm;

causing said support to continuously travel between said corona discharging electrode and said pass roller;

applying said single polar electrostatic charges on said surface of said continuously travelling long web support by said corona discharging electrode; and coating said coating portions of said support with said coating composition.

2. A charging method as recited in claim 1, wherein said predetermined distance equals a length of said corona discharging electrode that is at least 10 mm over each end of said coating portion of said support in a width direction thereof.

3. A charging method as recited in claim 1, wherein said coating composition is a photographic light-sensitive material.

4. A charging method as recited in claim 1, wherein said pass roller is made of at least one of aluminum and stainless steel.

5. A charging method as recited in claim 1, wherein said coating is ceramic made of a aluminum oxide particle, and a diameter thereof is not less than 30 μm not more than 40 μm 6. A charging method as recited in claim 5, wherein said ceramic surface coating is applied to the surface of said pass roller by a plasma projection.

7. A charging method as recited in claim 1, wherein a distance between said corona discharging electrode and said support is not less than 2.5 mm not more than 7.5 mm.

8. A charging method as recited in claim 1, wherein said coating composition is a magnetic recording material.

9. A charging apparatus comprising:
  a fine wire shaped corona discharging electrode connected to a direct-current high-voltage electric source; and
  a pass roller having a surface coating made of ceramic having a thickness in the range of greater than or equal to 0.3 mm and less than 0.5 mm, said pass roller facing said corona discharging electrode through a long web support that continuously travels therebetween, wherein said corona discharging electrode has a width that is wider than a width of said support by a predetermined distance and applies single polar electrostatic charges onto a surface of said continuously travelling long web support before coating said support with a coating composition.

10. A charging apparatus as recited in claim 9, wherein said predetermined distance equals a length of said corona discharging electrode that is at least 10 mm over each end of said coating portion of said support in a width direction thereof.

11. A charging apparatus as recited in claim 9, wherein said coating composition is a photographic light-sensitive material.

12. A charging apparatus as recited in claim 9, wherein said pass roller is made of at least one of aluminum and stainless steel.

13. A charging apparatus as recited in claim 9, wherein said coating is ceramic made of a aluminum oxide particle, and a diameter thereof is not less than 30 $\mu$m not more than 40 $\mu$m.

14. A charging method as recited in claim 13, wherein said ceramic surface coating is applied to the surface of said pass roller by a plasma projection.

15. A charging apparatus as recited in claim 9, wherein a distance between said corona discharging electrode and said support is not less than 2.5 mm not more than 7.5 mm.

16. A charging apparatus as recited in claim 9, wherein said coating composition is a magnetic recording material.

* * * * *